United States Patent Office 2,829,957
Patented Apr. 8, 1958

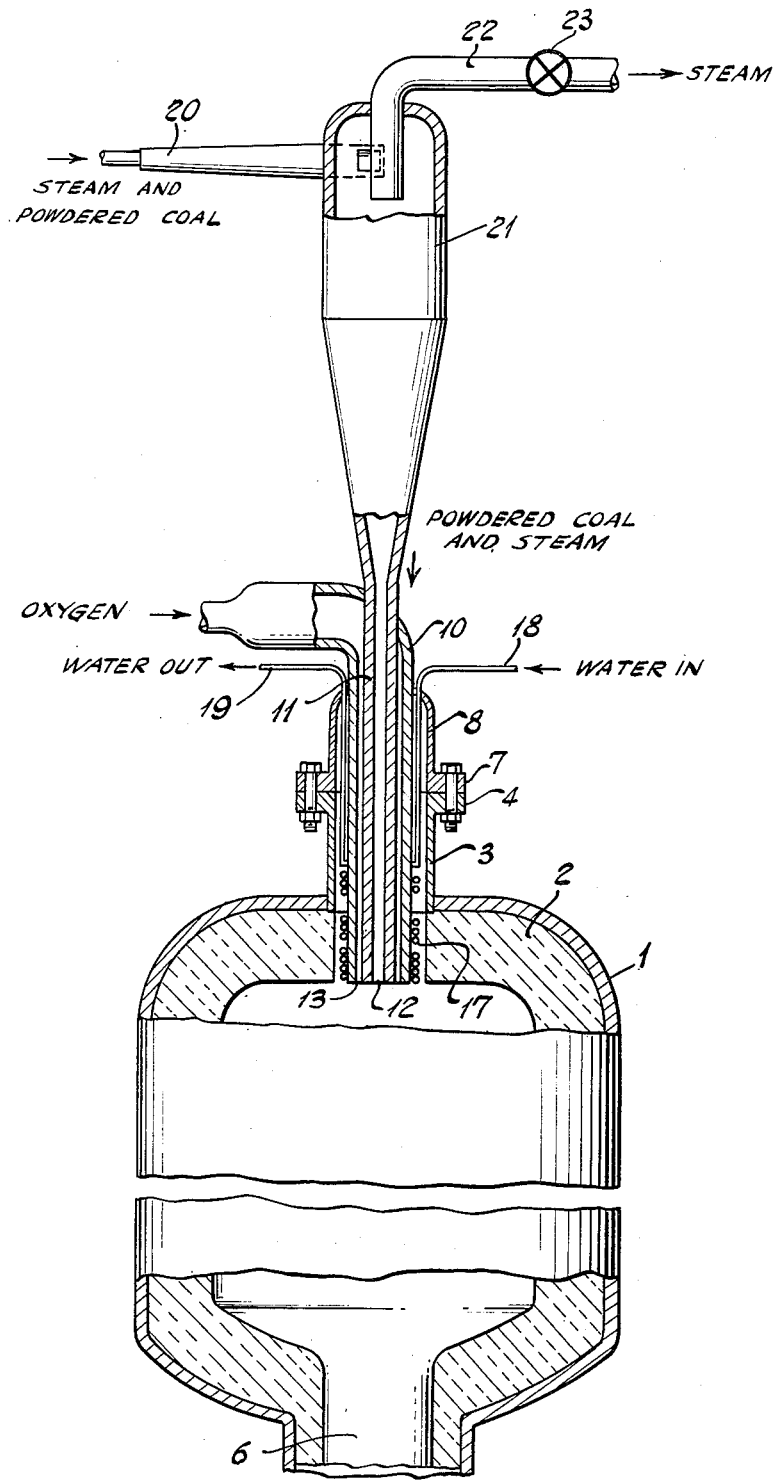

2,829,957

METHOD FOR PRODUCTION OF CARBON MONOXIDE FROM SOLID FUELS

Charles R. Carkeek, Pasadena, Calif., assignor to The Texas Company, New York, N. Y., a corporation of Delaware Application February 1, 1954, Serial No. 407,436

5 Claims. (Cl. 48—206)

This invention relates to a method of dispersing a powdered solid in a gasiform fluid. In one of its more specific aspects, this invention relates to a method of charging a finely divided solid reactant into a reaction zone and thoroughly admixing the solid within the reaction zone with a gasiform reactant. This invention is particularly applicable to the generation of a mixture of carbon monoxide and hydrogen by reaction of a solid fuel, for example, coal, with oxygen.

Gas mixtures consisting essentially of carbon monoxide and hydrogen are commercially important as a source of hydrogen for various reactions and as a source of feed gas for the synthesis of hydrocarbons, oxygenated organic compounds and/or ammonia. At the present time there is a great deal of interest in the commercial development of coal gasification processes in which the coal is reacted with relatively pure oxygen and steam to produce a mixture of carbon monoxide and hydrogen. The carbon monoxide may be readily converted to hydrogen by the so-called water gas shift reaction which involves reaction with steam at a temperature on the order of 700 to 800° F. in the presence of a suitable catalyst, such as iron oxide.

The present invention is directed to improvements in the gasification of solid fuels by reaction with a gaseous reactant. It is particularly applicable to generation of carbon monoxide and mixtures of carbon monoxide and hydrogen from a solid carbonaceous fuel. Suitable solid carbonaceous fuels include lignite, anthracite, bituminous coal, and coke. My invention is particularly suitable for reaction of a powdered solid carbonaceous fuel with oxygen and steam in a flow-type gasification reaction system. In the flow-type reaction system, solid particles are gasified while dispersed in the gaseous reactants and gaseous products of reaction. Gasification of a solid carbonaceous fuel with an oxygen-containing gas is usually conducted at a temperature within the range of 2000 to 3000° F., preferably 2200 to 2800° F. A compact, unpacked reaction zone is preferred. The reaction may be carried out at atmospheric pressure or at an elevated pressure on the order of 100 to 500 p. s. i. g. or higher.

Air may be used as the source of free oxygen. Preferably, the oxygen-containing gas contains in excess of 40 percent oxygen by volume, e. g., oxygen-enriched air. Substantially pure oxygen is often preferred, particularly in those cases in which it is desirable to produce a nitrogen-free product gas stream, e. g., hydrocarbon synthesis feed gas, fuel gas, or hydrogen. The reaction between free oxygen and carbonaceous fuel is exothermic. In addition to oxygen, steam is generally supplied to the reaction zone. The proportions of free oxygen and steam are such as to maintain the desired reaction temperature autogenously. Instead of steam, or in addition to it, other reducible oxygen-containing compounds may be supplied to the reaction zone, as for example, carbon dioxide or any of various reducible metal oxides, particularly oxides of iron, copper and zinc. In general, if a nitrogen-free product is desired, it is advantageous to conduct the gasification reaction with a mixture of steam and pure oxygen as the gaseous reactants.

It is desirable to conduct the gasification reaction in a well-insulated reactor and to preheat the reactants. The reactants are preferably preheated to a temperature above about 600° F. Some reactants, e. g., steam and carbon dioxide, may be heated to a temperature on the order of 1200° F. or higher without difficulty. Others, for example, high purity oxygen, may not be highly heated without undue expense or hazard. It is desirable that the oxygen be heated to a temperature as high as practical. Generally, however, it is not feasible to preheat commercially pure oxygen to a temperature above about 600° F. to 800° F.

In practice, the quantity of oxygen (from all sources) required for the conversion of a carbonaceous fuel to carbon monoxide (and hydrogen) is in excess of the amount required theoretically for conversion of all of the carbon in the fuel to carbon monoxide but substantially less than the amount required to convert all the carbon in the fuel to carbon dioxide. When coal, for example, is gasified with steam and oxygen in a continuous, self-sustaining reaction, the amount of free oxygen required is generaly on the order of 60 to 100 percent of the amount theoretically required to convert all of the carbon in the fuel to carbon monoxide, the remaining oxygen being supplied by the steam. Similar results are obtained when carbon dioxide is substituted in whole or in part for steam. The generator may be operated to yield a product consisting essentially of carbon monoxide and hydrogen and containing only a relatively small amount of carbon dioxide.

Powdered solid fuel may be effectively preheated prior to its introduction into the gas generation zone by forming a dispersion of the solid fuel in a suitable gasiform carrier, preferably steam, and simultaneously preheating both the carrier and the solid fuel by passing the dispersion through a heating zone, preferably, an externally heated helical coil. By this means, it is practical to readily heat steam and powdered coal, for example, to a temperature within the range of 600 to 1200° F. It is often advantageous to employ more steam in the formation of a dispersion than is ordinarily required or desirable in the reaction. The excess steam is separated from the solid fuel prior to introduction of the fuel and part of the steam to the generator.

The reaction of carbonaceous fuel with oxygen to produce high yields of carbon monoxide and negligible amounts of carbon dioxide presents problems not usually encountered in combustion of fuel. In the first place, it is essential to obtain very rapid and complete mixing of the reactants. In the second place, the burner must be so constructed that the reaction between the fuel and oxygen takes place entirely outside the burner proper within a suitable reaction zone.

The present invention solves the problem of rapidly and intimately mixing the reactants in a novel manner. In accordance with the present invention, finely divided solid fuel particles are suspended in a gasiform carrier, introduced tangentially into a vortex-forming zone, and discharged axially from the vortex zone as a swirling stream directly into the reaction zone. An oxygen-containing gas, preferably free oxygen, is supplied to the reaction zone annularly of said stream of dispersion. The oxygen-containing gas stream is preferably charged into the reaction zone in unidirectional unobstructed flow. The centrally charged swirling stream of dispersion fans out into the path of flow of the oxygen-containing gas stream, the spirally moving particles of solid being thrown directly into the surrounding annular stream of oxygen-containing gas. In this manner, very rapid and intimate mixing of the reactants is accomplished while, at the same time, the reactants are carried away from the tip of the burner so rapidly that the burner tip is protected from overheating.

The novel burner structure of my invention comprises a vortex-forming zone or vortex chamber in which a stream of solid fuel particles entrained in a carrier fluid is given a vortical movement. This is accomplished by tangential introduction of the stream of fuel particles into a cylindrical or annular vortex chamber forming a part of the burner structure. From the vortex chamber, the swirling stream of particles is discharged axially through a conduit, preferably smaller in diameter than the vortex chamber, directly into the reaction zone. The conduit through which the swirling stream of particles is transported from the vortex chamber to the reaction zone preferably has a straight bore of uniform diameter, and, preferably, is at least 10 diameters in length. This conduit may be flared at its discharge end. A second conduit, concentric with and surrounding the fuel supply conduit, supplies a stream of an oxygen-containing gas to the reaction zone. The two conduits preferably terminate within the reaction zone in a single plane. Alternatively the inner conduit terminates just within the outer one, preferably at a point such that the angle defined by the axis of the conduits and an imaginary line from the axis touching the inner periphery of the terminal ends of both conduits defines an angle of at least 45° and not more than 90°.

The burner preferably discharges the reactants axially into one end of a cylindrical reaction zone free from packing or catalyst with an inlet at one end for the introduction of reactants and an outlet at the opposite end for discharge of products of reaction. Preferably, the reactor has an internal surface area not more than 1.5 times the surface of a sphere of equal volume. A cylindrical reaction zone in which the length is at least equal to and not more than three times the diameter is generally preferred.

The present invention may be more readily understood by reference to the accompanying drawing which illustrates a preferred form of apparatus forming a part of the present invention.

The drawing is an elevational view, partly in cross section, showing a preferred embodiment of apparatus of this invention in combination with a flow-type reaction zone.

With reference to the drawing, the reactor comprises a cylindrical pressure vessel 1 provided with a refractory lining 2. At one end of the vessel, along its axis, is an inlet nozzle 3 provided with a flange 4 through which the burner is inserted into the reactor. A corresponding flange 7 attached to housing 8 cooperates with flange 5 to form a gas-tight seal between the burner and the pressure vessel. The reaction zone is preferably free from packing and catalyst. Reaction products are discharged from the reaction zone at the opposite end from the burner through a discharge nozzle 6.

Powdered solid and a gasiform reactant are separately introduced into the reaction zone through a pair of concentric tubular burner conduits 10 and 11. A swirling stream of solid particles in carrier fluid is introduced through the passageway 12 in the tube 11. As illustrated, the passageway 12 is of uniform diameter. Passageway 12 may be flared outwardly at its discharge end. Tube 11 has a straight section equal to at least 10 times the diameter of passageway 12 to insure uniform distribution of fuel at the burner tip. Oxygen-containing gas is supplied to the reactor through the annular passageway 13 between tubes 10 and 11. A cooling coil 17 surrounds conduit 10 to protect the burner nozzles from overheating; liquid coolant is introduced to coil 17 through line 18 and is discharged therefrom through line 19.

As illustrated, the concentric burner conduits or nozzles 10 and 11 terminate in a common plane normal to the axis of the nozzles. As previously mentioned, the inner nozzle may terminate a short distance within the outer nozzle. In this event, the discharge end of the inner nozzle should be so situated, with respect to the end of the outer nozzle, that a line from the axis of the conduits touching the inner surface of both nozzles at their terminal ends makes an angle with the axis of at least 45°. The limiting angle is, of course, 90°, at which position the nozzles terminate in a common plane.

Powdered solid fuel entrained in a gasiform carrier, preferably steam, is introduced through conduit 20 into a cylindrical vortex chamber 21 forming a part of the burner. The stream of fuel particles is introduced tangentially into chamber 21 at a velocity on the order of 100 feet per second or higher. Tangential introduction of the dispersion into the cylindrical vortex chamber imparts a swirling motion to the dispersion. The coal particles are thrown outward against the periphery of chamber 21 by centrifugal force. As illustrated in the drawing, a preferred embodiment of the burner structure of this invention, the vortex chamber 21 may take the form of a cyclone separator.

Carrier fluid, substantially free from fuel particles, is discharged through line 22. Outlet pipe 22 extends into the vortex chamber 21 to a point beyond the point of introduction of fuel and carrier fluid through line 20. A valve 23 is preferably provided in the discharge line 22 by means of which the relative amounts of fluid discharged through line 22 and through conduit 11 may be controlled.

The powdered fuel, together with at least a portion of the carrier fluid is discharged through passageway 12 into the generator while still swirling at relatively high velocity. The swirl motion imparted to the fuel particles in vortex chamber 21 persists throughout the path of flow of the powdered fuel through conduit 11. Upon leaving the discharge end of conduit 11, the coal particles spray out into the oxygen stream discharged through annular passageway 13. This tendency for the fuel stream to fan out into the path of the oxygen-containing gas stream insures rapid and intimate mixing of the powdered fuel and oxygen-containing gas at the point of discharge of these reactants into the reaction zone.

Conduit 20, at the approach to the vortex chamber, passes through a transition from a conduit of circular cross section to one of rectangular cross section. In one specific example, the transition is from a ½ inch E. H. pipe to a rectangular conduit having an internal cross-sectional area of 1½ inches by ½ inch. This conduit enters the vortex chamber with the longer side tangent to the inner wall of the chamber.

It is desirable to impart a high velocity to the fuel particles entering the vortex chamber. The velocity of the stream introduced through line 20 should be at least 100 feet per second and preferably is much higher. As the velocity of the entering stream is increased, in a vortex chamber of a given size, the more effective is the vortex chamber in imparting a swirl to the stream of fuel particles discharged through line 11. Increased velocity also improves the efficiency of the separation of fuel particles from the carrier fluid. In general, it is desirable to employ a vortex chamber of the smallest practicable diameter to develop maximum swirl. High velocities in the vortex chamber result in considerable pulverization of the fuel particles.

High velocities may be developed at or immediately adjacent the point of introduction of fuel and carrier fluid to the vortex chamber. In accordance with a specific embodiment of this invention a convergent-divergent (De Laval type) nozzle is placed in line 20 immediately adjacent the inlet to the vortex chamber. A nozzle having an included angle on the discharge (divergent) side in the range of about 8 to 24° is suitable. With a convergent-divergent nozzle, supersonic velocities may be attained.

Transition from the vortex chamber to the solids discharge pipe is preferably gradual. A frusto-conical section having an apex angle or included angle in the range of 12° to 30° is preferred.

At least a portion of the carrier fluid remains in admixture with the powdered fuel discharged through line 11 from the vortex chamber into the reaction zone. Steam is generally used as the carrier fluid, coal or coke, as solid fuel. Relatively complete separation of powdered coal or coke from steam may be effected in the separator. Relatively complete separation of powdered solid from gasiform carrier may be made if the amount of fluid separated from the mixture is limited to from about 80 to 90 percent of the fluid in the dispersion. In a specific example, a dispersion consisting of equal parts by weight of steam and powdered coal is fed to a burner constructed as illustrated in the drawing and having a vortex chamber 4 inches in diameter. About 90 percent of the steam may be withdrawn from the separator substantially completely free from coal particles. Concentrations of solid fuel particles in the separated steam vary from about 0.1 percent by weight when 10 percent of the steam is separated to about 1 percent by weight when 90 percent of the steam is separated.

By means of valve 23 it is possible to control the amount of steam separated from the powdered coal within the range of from about 5 percent to substantially the full amount introduced through pipe 20. It is usually not desirable to supply more steam than an amount equal in weight to the weight of the coal.

A dispersion of coal in steam leaving the central tube of a burner constructed as illustrated in the drawing fans out, with no flow of gas through the annular passageway, in the form of a cone having an apex angle within the range of 60 to 100°. By way of comparison, the corresponding solid angle of a jet discharged without induced swirl from a straight pipe is less than 10°.

The method and apparatus of my invention has been described throughout this application as applied to the mixing of a solid fuel with an oxygen-containing gas. It will be appreciated by those skilled in the art that both the method and the apparatus disclosed herein are useful for producing a rapid and intimate dispersion of solid particles in gas in general. My method and apparatus are particularly advantageous for rapidly and intimately mixing a powdered solid with a gasiform reactant. For example, the method and apparatus of this invention may be employed in reactions between a powdered elemental reactant, including metals, e. g., aluminum, magnesium, iron, copper, lead and zinc, as well as other non-metals, e. g., sulfur, phosphorus and arsenic, with a gasiform oxidant, e. g., oxygen or a halogen. My invention may also be applicable to the reduction of a metal oxide, e. g., copper oxide, with a gasiform reducing agent, e. g., hydrogen or carbon monoxide.

Obviously, many modifications and variations of the invention, as hereinbefore set forth, may be made without departing from the spirit and scope thereof, and therefore only such limitations should be imposed as are indicated in the appended claims.

I claim:

1. In the generation of a mixture of carbon monoxide and hydrogen by reaction of a carboniferous solid fuel with free oxygen in a reaction zone, the improvement which comprises forming a dispersion of powdered solid fuel in a gasiform carrier fluid, introducing a stream of said dispersion tangentially into a cylindrical vortex-forming zone having a straight longitudinal axis throughout and positioned in close proximity to said reaction zone, discharging a swirling stream of said powdered fuel entrained in said carrier fluid axially of said vortex-forming zone in straight line flow directly into said reaction zone into an axially moving surrounding stream of gas containing free oxygen effecting intimate mixture between said swirling stream of fuel and said free oxygen, and subjecting said mixture to reaction in said reaction zone.

2. A method as defined in claim 1 wherein the relationship between the vortical velocity and the axial velocity of said swirling stream discharged from said vortex zone is such that said stream in free flow, with no annular flow of gas, takes the form of a cone having a solid angle within the range of 60° to 100°.

3. A method as defined in claim 1 wherein said carrier fluid is steam.

4. A method as defined in claim 1 wherein the swirling stream of solid discharged axially of said vortex-forming zone is of smaller diameter at its point of discharge from said zone than the maximum diameter of said vortex zone.

5. A method as defined in claim 1 wherein a portion of said carrier fluid substantially free from said solid is withdrawn from said vortex zone.

References Cited in the file of this patent

UNITED STATES PATENTS

| | | |
|---|---|---|
| 2,385,508 | Hammond | Sept. 25, 1945 |
| 2,515,542 | Yellott | July 18, 1952 |
| 2,656,264 | Yellott | Oct. 20, 1953 |

FOREIGN PATENTS

| | | |
|---|---|---|
| 338,108 | Great Britain | Nov. 3, 1930 |

OTHER REFERENCES

Industrial and Engineering Chemistry, vol. 49, No. 4, April 1948, pages 570 and 571.

American Gas Assn. Publication PC–52–12, "The Continuous Pressure Gasification of Pulverized Coal in Suspension," by C. G. Von Fredersdorff et al. (May 1952) (17 pp.), pages 2 and 3 relied upon.

American Gas Assn. Publication PC–53–21, "Influence of Operating Variables," by C. G. Von Fredersdorff et al. (May 1953) (35 pp.), pages 3, 4 and 5 relied upon.